(12) United States Patent
Yoon

(10) Patent No.: US 7,492,101 B2
(45) Date of Patent: Feb. 17, 2009

(54) PLASMA DISPLAY PANEL

(75) Inventor: Cha-Keun Yoon, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 551 days.

(21) Appl. No.: 10/968,161

(22) Filed: Oct. 20, 2004

(65) Prior Publication Data

US 2005/0093450 A1    May 5, 2005

(30) Foreign Application Priority Data

Oct. 31, 2003    (KR)    ............... 10-2003-0076709

(51) Int. Cl.
*H01J 17/49* (2006.01)
(52) U.S. Cl. .................. 313/586; 313/582; 313/587
(58) Field of Classification Search .......... 313/582–587
See application file for complete search history.

(56) References Cited

U.S. PATENT DOCUMENTS 6,346,775 B1 *   2/2002   Lee et al. .................... 313/309

2004/0256975 A1*  12/2004   Gao et al. .................... 313/495

FOREIGN PATENT DOCUMENTS

| JP | 2000-268728 A1 | 9/2000 |
| JP | 2001-222944 A1 | 8/2001 |
| JP | 2002-304950 | 10/2002 |
| JP | 2003-272530 A1 | 9/2003 |
| JP | 2003-297250 A1 | 10/2003 |
| KR | 2002014480 A * | 2/2002 |
| WO | 01/79361 | 10/2001 |

* cited by examiner

*Primary Examiner*—Nimeshkumar D Patel
*Assistant Examiner*—Anne M Hines
(74) *Attorney, Agent, or Firm*—H.C. Park & Associates, PLC

(57) ABSTRACT

Provided is a plasma display panel capable of reducing an addressing discharge voltage and a sustaining discharge voltage and improving luminous efficiency. The plasma display panel comprises a dielectric layer formed on a lower substrate, partitions formed on the dielectric layer, and red, green, and blue discharge cells defined by the partitions. Red, green, and blue fluorescent layers are formed in the red, green, and blue discharge cells, respectively. Carbon nanotube layers are provided in at least one red, green, or blue discharge cell.

23 Claims, 4 Drawing Sheets

PLASMA DISPLAY PANEL

This application claims the benefit of Korean Patent Application No. 2003-76709, filed on Oct. 31, 2003, which is hereby incorporated by reference for all purposes as if fully set forth herein.

BACKGROUND OF THE INVENTION

1. Field of the Invention

The present invention relates to a plasma display panel, and more particularly, to a plasma display panel capable of reducing an addressing discharge voltage and/or a sustaining discharge voltage and improving color balance and/or luminous efficiency.

2. Discussion of the Related Art

FIG. 1 is a partial perspective view showing a conventional plasma display panel (PDP). The PDP includes upper and lower panels 10 and 20. The upper panel 10 includes a front substrate 11, a pair of sustaining discharge electrodes 12 provided on a lower surface 11a of the front substrate 11, an upper dielectric layer 15 covering the pair of sustaining discharge electrodes 12, and a protective layer 16 covering the upper dielectric layer 15. The lower panel 20 includes a rear substrate 21, address electrodes 22 formed on an upper surface 21a of the rear substrate 21 orthogonally to the pair of sustaining discharge electrodes 12, a lower dielectric layer 23 covering the address electrodes 22, partitions 24 provided on the lower dielectric layer 23, and fluorescent layers 25R, 25G, and 25B provided in discharge cells defined by the partitions 24.

Such a PDP may, however, require a high addressing discharge voltage and a high sustaining discharge voltage. Additionally, there may be a need to improve its luminous efficiency.

SUMMARY OF THE INVENTION

The present invention provides a PDP capable of reducing an addressing discharge voltage and a sustaining discharge voltage and improving luminous efficiency.

Additional features of the invention will be set forth in the description that follows, and in part will be apparent from the description, or may be learned by practice of the invention.

The present invention discloses a plasma display panel (PDP), comprising a dielectric layer formed on a lower substrate, partitions formed on the dielectric layer, and red, green, and blue discharge cells defined by the partitions. Red, green, and blue fluorescent layers are formed in the red, green, and blue discharge cells, respectively. Carbon nanotube layers are provided in at least one red, green, or blue discharge cell.

The present invention also discloses a plasma display panel (PDP), comprising a dielectric layer formed on a lower substrate, partitions formed on the dielectric layer, and red, green, and blue discharge cells defined by the partitions. Red, green, and blue fluorescent layers are formed in the red, green, and blue discharge cells. Carbon nanotubes are embedded in at least one red, green, or blue fluorescent layer.

The present invention also discloses a light emitting layer comprising a fluorescent layer and a carbon nanotube layer.

The present invention also discloses a light emitting layer comprising carbon nanotubes embedded in a fluorescent layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
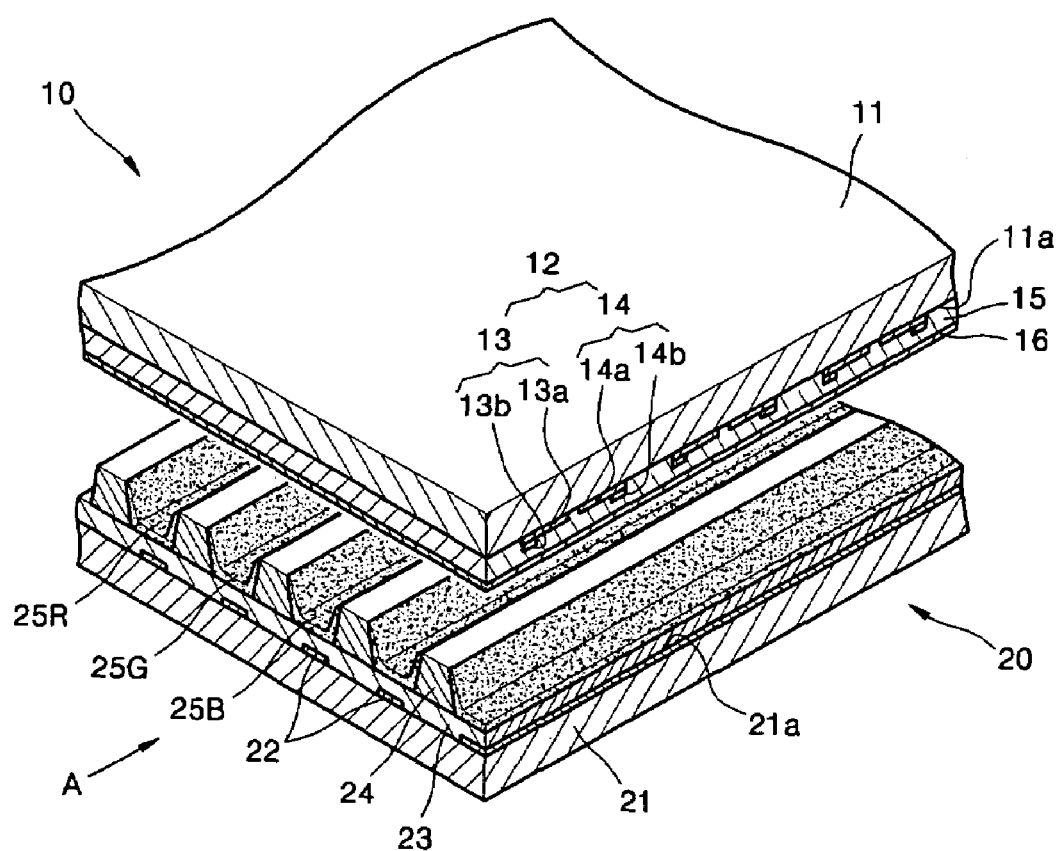
FIG. 1 is a partial perspective view showing a conventional surface discharge PDP.
Figure 2:
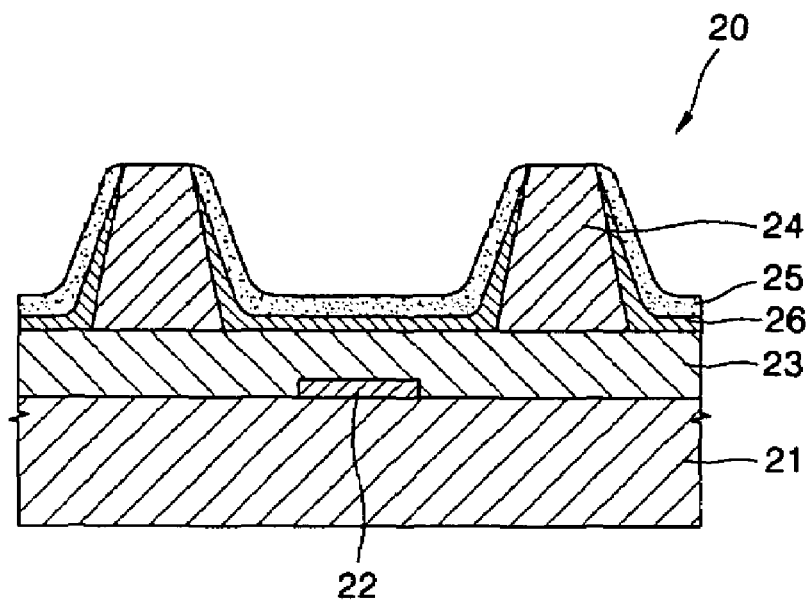
FIG. 2 is a cross sectional view of a lower panel of a PDP according to a first exemplary embodiment of the present invention as seen in a direction A of FIG. 1.

A first exemplary embodiment of the present invention will now be described with reference to FIG. 1 and FIG. 2. FIG. 1 is a partial perspective view illustrating a conventional surface discharge PDP. A PDP according to the first exemplary embodiment has a structure similar to the conventional PDP shown in FIG. 1 except for a lower panel 20, which is shown in FIG. 2. FIG. 2 is a cross sectional view of the lower panel 20 of the PDP according to the first exemplary embodiment as seen in a direction A of FIG. 1.

The PDP according to the first exemplary embodiment includes upper and lower panels 10 and 20. The upper panel 10 includes a front substrate 11, pairs of sustaining discharge electrodes 12 provided on a lower surface 11a of the front substrate 11, and an upper dielectric layer 15 covering the pairs of sustaining discharge electrodes 12. The upper panel 10 may further include a protective layer 16, made of MgO, covering the upper dielectric layer 15.

The lower panel 20 includes a rear substrate 21 disposed to be parallel to the front substrate 11, address electrodes 22 formed on an upper surface 21a of the rear substrate 21 orthogonally to the pair of sustaining discharge electrodes 12, a lower dielectric layer 23 covering the address electrodes 22, partitions 24 provided on the lower dielectric layer 23, carbon nanotube (CNT) layers 26 provided in at least one discharge cell out of red, green, and blue discharge cells defined by the partitions 24; and red, green, and blue fluorescent layers 25R, 25G, and 25B provided in the red, green, and blue discharge cells, respectively. In the first exemplary embodiment, the CNT layers 26 are interposed between the lower dielectric layer 23 and the fluorescent layers 25.

The front substrate 11 is typically made of a transparent material containing a main component of glass.

The pair of sustaining discharge electrodes 12 includes two sustaining discharge electrodes 13 and 14 formed on the lower surface 11a of the front substrate 11. The pairs of sustaining discharge electrodes 12 are disposed parallel to each other at a predetermined interval on the front substrate 11. The pair of sustaining discharge electrodes 12 includes a scanning electrode 13 and a common electrode 14.

Each of the scanning and common electrodes 13 and 14 generally comprises a transparent electrode 13a, 14a and a bus electrode 13b, 14b. In some cases, each of the scanning and common electrodes 13 and 14 may be constructed with only the bus electrodes 13b and 14b.

The transparent electrodes 13a and 14a may be made of a transparent conductive material, such as indium tin oxide (ITO), capable of generating a discharge and allowing rays of light generated by fluorescent layers to pass to the front substrate 11. However, the transparent conductive material, such as ITO, may have a relatively high electrical resistance. If the sustaining discharge electrodes 12 are constructed with only the transparent electrode 13a and 14a, their longitudinal voltage drop increases, which requires a high driving voltage and lowers a response speed. In order to solve these problems, the bus electrodes 13b and 14b, made of a conductive metal, for example, Ag, are provided on the outer side end portions of the transparent electrodes 13a and 14a. When there is no transparent electrode, the bus electrodes 13b and 14b may be directly formed on the lower surface 11a of the front substrate 11.

The bus electrodes 13b and 14b may be formed with a highly conductive metal. However, most of the highly conductive metals are not transparent to light. When bus electrodes 13b and 14b are made of a non-transparent material, they may be formed with two layers in order to improve the PDP's contrast and brightness. A first electrode layer near the front substrate 11 may contain a material having a dark component for absorbing external rays of light, and a second electrode layer near the fluorescent layers may contain a material having a bright component for reflecting visible rays of light generated from the fluorescent layers. Herein, the dark component means a component of a color having a high absorbance of light, and the bright component means a highly reflective component of a color. Examples of a material having a dark component include ruthenium and cobalt, and examples of a material having a bright component include silver, aluminum, and gold.

The upper dielectric layer 15 is made of a dielectric material capable of preventing the scanning and common electrodes 13 and 14 from short circuiting, preventing the sustaining discharge electrodes 12 from deteriorating by the bombardment of positive ions or electrons, and inducing accumulating wall electric charges. The dielectric material may be highly transparent. Examples of the dielectric material include PbO, $B_2O_3$, and $SiO_2$.

The protective layer 16 may be made of a material capable of preventing the upper dielectric layer 15 from deteriorating by the bombardment of the positive ions and electrons during a discharge and capable of emitting a large amount of secondary electrons. The material may be highly transparent. MgO is typically used to form the protective layer 16. In some cases, the protective layer may be not formed.

The rear substrate 21 supports the lower panel 20.

The address electrodes 22 generate an addressing discharge, which is generated between the scanning and address electrodes 13 and 22, to enable the sustaining discharge between the scanning and common electrodes 13 and 14. When the addressing discharge is completed, positive ions and electrons are accumulated on the scanning and common electrodes 13 and 14, respectively.

The lower dielectric layer 23 is made of a dielectric material capable of preventing the address electrode 22 from deteriorating by the bombardment of positive ions or electrons during an addressing discharge and capable of inducing electric charges. Examples of the dielectric material include PbO, $B_2O_3$, and $SiO_2$.

The partitions 24 define regions where the fluorescent layers 25R, 25G, and 25B are applied and prevent cross talk between the discharge cells. Although the partitions 24 are illustrated as having a stripe shape in FIG. 1, they may have various shapes, including a matrix shape, a honeycomb, or other like similar shapes.

A discharge cell means one of three sub-pixels constituting a pixel. It is a minimal driving unit for implementing an image. When the partitions 24 are formed to have a shape of a matrix or a honeycomb, each of the discharge cells corresponds to a space defined by the partitions 24. On the other hand, when the partitions 24 are formed as a stripe shape, each of the discharge cells corresponds to a space defined by two neighboring partitions 24 and a pair of sustaining discharge electrodes 12. Discharge cells are considered either red, green, or blue discharge cells depending on the red, green, or blue fluorescent layer 25R, 25G, and 25B provided therein. A discharge space, which is a space between the upper and lower panels 10 and 20, is filled with a discharge gas that may generally be a mixture of Ne and Xe.

The CNT layers 26 are disposed in at least one discharge cell of the red, green, and blue discharge cells. A CNT layer means a layer where carbon nanotubes (CNTs) are contained. The CNT is a tubular material assembled by carbon elements, and it has excellent electron-emission and electric field focusing properties. Therefore, a PDP using CNTs may generate an addressing discharge between the scanning and address electrodes 13 and 22 even when applying a lower addressing discharge voltage than in a conventional PDP. The CNTs may also allow generation of a sustaining discharge between the scanning electrode and common electrodes 13 and 14 with a lower sustaining discharge voltage. Additionally, when the same levels of addressing discharge and sustaining discharge voltages as in the conventional PDP are applied to electrodes of the present exemplary embodiment, it may be possible to improve brightness.

In the first exemplary embodiment, the CNT layers 26 may be disposed in discharge cells having a red, green, or blue fluorescent layer 25R, 25G, and 25B. When the luminous efficiency of one of the red, green, and blue fluorescent layers 25R, 25G, and 25B is lower than the others, the CNT layers 26 may be disposed in the discharge cell having the fluorescent layer 25 with the lowest luminous efficiency. This arrangement may make it possible to improve the PDP's color balance.

On the other hand, when the luminous efficiency of a red, green, or blue fluorescent layer 25R, 25G, and 25B is higher than the others, the CNT layers 26 may be disposed in the discharge cells having the two fluorescent layers 25 with a lower brightness. This arrangement may also make it possible to improve the PDP's color balance. Additionally, when the luminous efficiency of the red, green, and blue fluorescent layers 25R, 25G, and 25B is similar, the CNT layers 26 may be disposed in all discharge cells. This arrangement may make it possible to improve the PDP's brightness or reduce the addressing discharge voltage and the sustaining discharge voltage.

As shown in FIG. 2, in the first exemplary embodiment, the CNT layers 26 are interposed between the fluorescent layers 25 and the lower dielectric layer 23 and between the fluorescent layers 25 and the partitions 24. A fluorescent layer subjected previously to a firing process may have many pores on its surface and in its interior. Therefore, even when the CNT layers 26 are disposed underneath the fluorescent layers 25, it may be possible to obtain the aforementioned advantages of the CNT layers 26. A fluorescent layer 25 is excited by ultraviolet light generated from discharge gas, and visible light is emitted when the excited fluorescent layer goes to its lower energy level. Since electrons supplied from the CNT layer 26 may also excite the fluorescent layer 25, its luminous efficiency may be improved.

A CNT layer 26 may be formed by preparing a paste containing CNTs. The paste may be applied to an upper surface of the lower dielectric layer 23 and to a lateral surface of the partitions 24. Finally, the CNT-containing paste is subjected to drying and firing processes, which forms the CNT layer 26. The partitions are normally subjected to a firing process at least 550° C. Because the CNTs may lose their electric field emission characteristics at 510° C., the CNT-containing paste may be applied after the firing process of the partitions.

In the PDP described above, applying the addressing discharge voltage Va between the scanning and address electrodes 13 and 22 generates the addressing discharge. As a result of the addressing discharge, wall charges accumulate on an upper surface of the lower dielectric layer 23 and a lower surface of the upper dielectric layer 15, thereby selecting the discharge cells for a sustaining discharge.

Then when the sustaining discharge voltage Vs is applied between the scanning and common electrodes 13 and 14 of the selected discharge cells, positive ions and electrons accumulated on the scanning and common electrodes 13 and 14, respectively, collide with each other, generating the sustaining discharge. Ultraviolet light is emitted when the element Xe, excited during the sustaining discharge, drops to a lower energy level. The ultraviolet light excites the fluorescent layers 25R, 25B, and 25G, and when the layers drop to a lower energy level, visible light is emitted, thereby forming an image.

Figure 3:
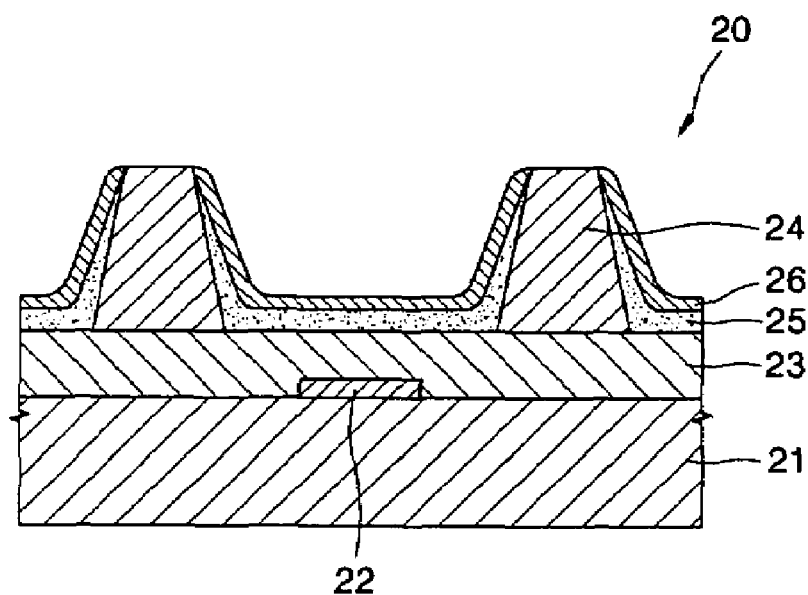
FIG. 3 is a cross sectional view of a lower panel of a PDP according to a second exemplary embodiment of the present invention as seen in a direction A of FIG. 1.

A PDP according to a second exemplary embodiment of the present invention will be described with reference to FIG. 3. The description generally focuses on a difference between the first and second exemplary embodiments, which is that CNT layers 26 are disposed on the fluorescent layers 25. According to the second exemplary embodiment, since a larger number of CNTs may be exposed to discharge spaces of discharge cells, it may be possible to further reduce the addressing discharge voltage and the sustaining discharge voltage compared to the first exemplary embodiment. In particular, at least some of the CNTs contained in the CNT layers 26 may extend upward from upper surfaces of the CNT layers 26, which may further improve the electron emission and electric field focusing characteristics. Additionally, the CNT layers 26 may be non-transparent and darker than the fluorescent layers 25. Therefore, since the CNT layers 26 absorb external light entering the PDP, it may be possible to improve the PDP's contrast. In the second exemplary embodiment, the CNT layers 26 are formed on the fluorescent layers 25 after the fluorescent layers 25 are formed.

Figure 4:
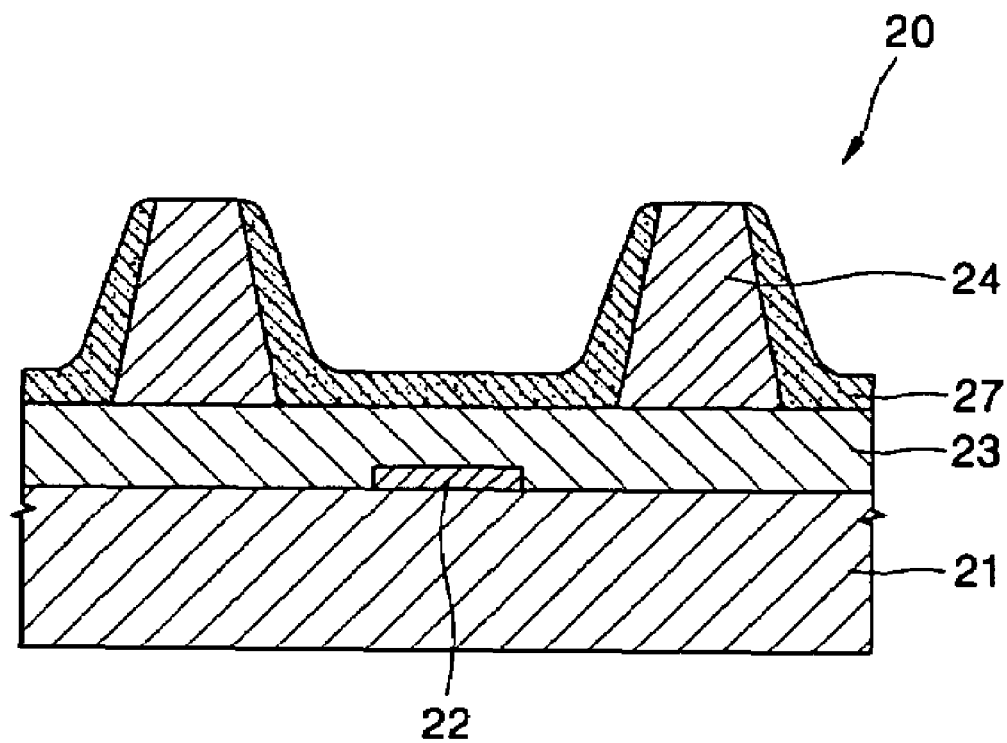
FIG. 4 is a cross sectional view of a lower panel of a PDP according to a third exemplary embodiment of the present invention as seen in a direction A of FIG. 1.

A PDP according to a third exemplary embodiment of the present invention will now be described with reference to FIG. 4. The description generally focuses on a difference between the first and third exemplary embodiments, which is that CNTs are embedded in fluorescent layers 27 instead of being disposed as a CNT layer 26 underneath the fluorescent layers 25. The fluorescent layers 27 may be formed by applying a fluorescent paste mixed with CNT powder on a lower dielectric layer 23 and drying and firing the same. Since the CNTs may be much smaller than fluorescent particles, the CNTs may be embedded in gaps between them.

Like the first exemplary embodiment, the CNTs may be embedded in one, two, or all of the red, green, and blue fluorescent layers 25R, 25G, and 25B.

Like the second exemplary embodiment, since a larger number of the CNTs may be involved in the address and sustaining discharges, it may be possible to further reduce the addressing discharge voltage and the sustaining discharge voltage as compared to the first exemplary embodiment. In particular, at least some of the CNTs may extend upward from upper surfaces of a fluorescent layer (hereinafter, referred to as a "CNT-embedded layer") where the CNTs are embedded. This arrangement may make it possible to further improve the electron emission and electric field focusing characteristics. Additionally, the CNT-embedded layers may be non-transparent and darker than other fluorescent layers. Therefore, since the CNT-embedded layers may absorb external rays of light entering the PDP, it may be possible to improve the PDP's contrast.

In the third exemplary embodiment, a CNT layer does not need to be separately formed, therefore, the process of the third exemplary embodiment may be simpler than the first and second exemplary embodiments. Consequently, it may be possible to reduce the PDP's manufacturing time and costs.

Excessive CNTs may reduce the fluorescent layer's luminous efficiency. Therefore, when including a CNT layer or embedded CNTs in discharge cells in accordance with the first, second, and third exemplary embodiments, an amount of the CNTs may be 10% or less based on a weight of the fluorescent layer. Further, when forming the CNT layer according to the first and second exemplary embodiments, the CNT layer may have a thickness of 5 μm or less.

Figure 5:
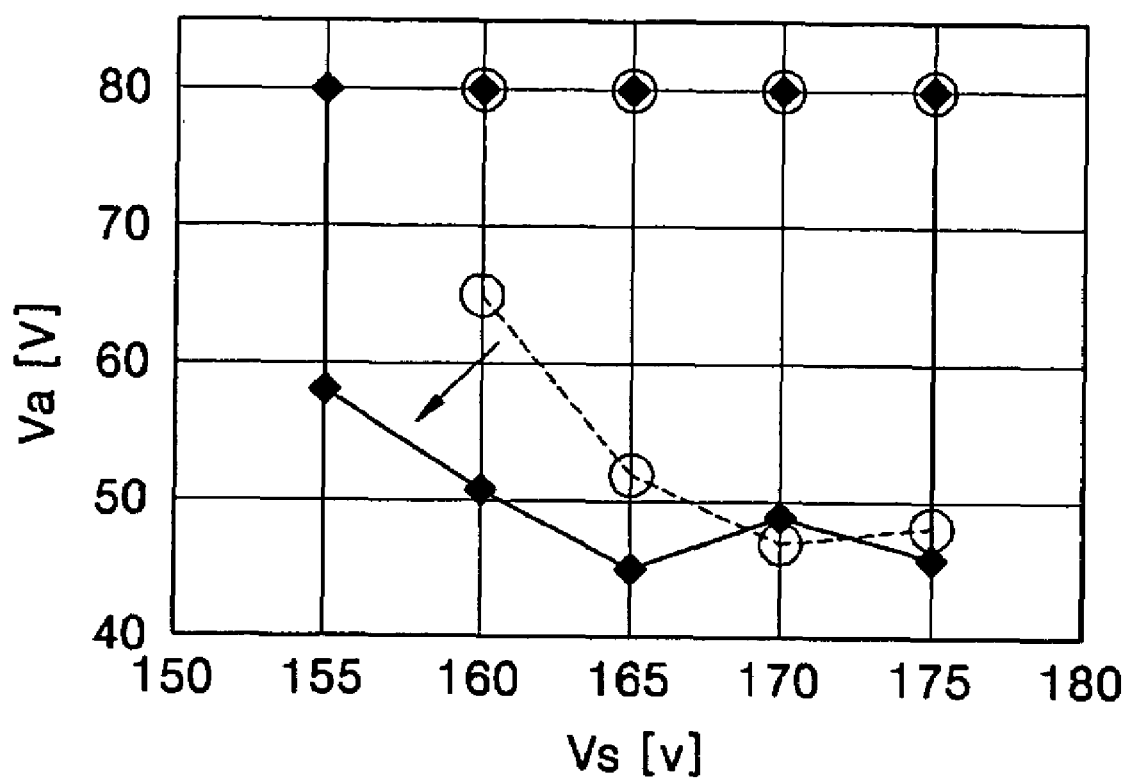
FIG. 5 is a graph showing addressing and sustain discharge voltages of a conventional PDP and a PDP according to the second exemplary embodiment of the present invention.

In a PDP according to exemplary embodiments of the present invention, it may be possible to reduce an addressing discharge voltage and/or a sustaining discharge voltage. FIG. 5 is a graph showing addressing discharge voltage $V_a$ and sustain discharge voltage $V_s$ of a conventional PDP and a PDP according to the second exemplary embodiment of the present invention. A small 6 inch test panel was fabricated by spraying a CNT layer on a fluorescent layer, and an experiment was conducted to measure the impact of the CNT layer on addressing and sustain discharges. Referring to FIG. 5, the region surrounded by the dotted line, which overlaps portions of the solid line where $V_s$ equals 175V and $V_a$ equals 80V, shows discharge conditions without the CNT layer, and the region surrounded by the solid line shows discharge conditions with the CNT layer. As shown by FIG. 5, adding the CNT layer on the fluorescent layer may reduce an addressing and a sustain discharge voltage by about 5V.

Additionally, in a PDP according to exemplary embodiments of the present invention, it may be possible to improve image quality by balancing the luminous efficiency of red, green, and blue discharge cells. Generally, a green discharge cell may have worse discharge characteristics and better brightness characteristics than a red and a blue discharge cell. Accordingly, an amount of CNTs, or a thickness of a CNT layer, in a green discharge cell may be greater than an amount of CNTs, or a thickness of a CNT layer, in a red and blue discharge cell.

Additionally, in a PDP according to exemplary embodiments of the present invention, it may be possible to improve contrast.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A plasma display panel (PDP), comprising:
   a lower substrate;
   a dielectric layer formed on the lower substrate;
   partitions formed along a first direction on the dielectric layer;
   red, green, and blue discharge cells defined by the partitions; and
   a red, green, and blue fluorescent layer formed in the red, green, and blue discharge cells, respectively;
   wherein a carbon nanotube (CNT) layer extends along the first direction and completely covers the red, green, or blue fluorescent layer.

2. The PDP of claim 1, wherein the CNT layer is disposed on the red, green, or blue fluorescent layer.

3. The PDP of claim 2, wherein an upper surface of the CNT layer comprises a carbon nanotube extending upward.

4. The PDP of claim 1, wherein the CNT layer is disposed in a discharge cell where one fluorescent layer having a lowest luminous efficiency among the red, green, and blue fluorescent layers is provided.

5. The PDP of claim 1, wherein the CNT layer is disposed in discharge cells where two fluorescent layers having lower luminous efficiency among the red, green, and blue fluorescent layers are provided.

6. The PDP of claim 1, wherein the CNT layer is disposed in the red, green, and blue discharge cells.

7. A plasma display panel (PDP), comprising:
   a lower substrate;
   a dielectric layer formed on the lower substrate;
   partitions formed on the dielectric layer;
   red, green, and blue discharge cells defined by the partitions; and
   a red, green, and blue fluorescent layer formed in the red, green, and blue discharge cells, respectively;
   wherein a carbon nanotube (CNT) layer completely covers the red, green, or blue fluorescent layer, or is a continuous layer contacting a first partition, a second partition, and the dielectric layer in at least one corresponding red, green, or blue discharge cell,
   wherein the CNT layer is disposed in the red, green, and blue discharge cells, and
   wherein the CNT layer in the green discharge cell is thicker than the CNT layer in the blue discharge cell and the CNT layer in the red discharge cell.

8. A plasma display panel (PDP), comprising:
   a lower substrate;
   a dielectric layer formed on the lower substrate;
   partitions formed on the dielectric layer;
   red, green, and blue discharge cells defined by the partitions; and
   a red, green, and blue fluorescent layer formed in the red, green, and blue discharge cells, respectively;
   wherein a carbon nanotube (CNT) layer completely covers the red, green, or blue fluorescent layer, or is a continuous layer contacting a first partition, a second partition, and the dielectric layer in at least one corresponding red, green, or blue discharge cell, and
   wherein an amount of CNTs in a discharge cell equals 10% or less of a weight of a fluorescent layer in the discharge cell.

9. A plasma display panel (PDP), comprising:
   a lower substrate;
   a dielectric layer formed on the lower substrate;
   partitions formed on the dielectric layer;
   red, green, and blue discharge cells defined by the partitions; and
   a red, green, and blue fluorescent layer formed in the red, green, and blue discharge cells, respectively;
   wherein a carbon nanotube (CNT) layer completely covers the red, green, or blue fluorescent layer, or is a continuous layer contacting a first partition, a second partition, and the dielectric layer in at least one corresponding red, green, or blue discharge cell, and
   wherein the CNT layer has a thickness of 5 µm or less.

10. A plasma display panel (PDP), comprising:
    a lower substrate;
    a dielectric layer formed on the lower substrate;
    partitions formed on the dielectric layer;
    red, green, and blue discharge cells defined by the partitions; and
    red, green, and blue fluorescent layers comprising a fluorescent paste and formed in the red, green, and blue discharge cells, respectively;
    wherein carbon nanotubes (CNTs) are mixed with the fluorescent paste to form the light emitting layer and to be embedded in gaps between fluorescent particles in at least one red, green, or blue fluorescent layer.

11. The PDP of claim 10, wherein the CNTs are embedded in gaps between fluorescent particles in one fluorescent layer having the lowest luminous efficiency among the red, green, and blue fluorescent layers.

12. The PDP of claim 10, wherein the CNTs are embedded in gaps between fluorescent particles in two fluorescent layers having lower luminous efficiency among the red, green, and blue fluorescent layers.

13. The PDP of claim 10, wherein the CNTs are embedded in gaps between fluorescent particles in the red, green, and blue fluorescent layers.

14. The PDP of claim 13,
    wherein more CNTs are in the green fluorescent layer than are in the blue fluorescent layer; and
    wherein more CNTs are in the green fluorescent layer than are in the red fluorescent layer.

15. The PDP of claim 10, wherein a CNT extends upward from an upper surface of each of the red, green, and blue fluorescent layers in which the CNTs are embedded.

16. The PDP of claim 10, wherein an amount of CNTs in a discharge cell equals 10% or less of a weight of a fluorescent layer in the discharge cell.

17. A light emitting layer, comprising:
    a fluorescent layer; and
    a carbon nanotube layer,
    wherein the carbon nanotube layer and partitions extend along the same direction, and
    wherein the carbon nanotube layer completely covers the fluorescent layer.

18. The light emitting layer of claim 17, wherein the carbon nanotube layer is formed on the fluorescent layer.

19. The light emitting layer of claim 17, further comprising:
    a red fluorescent layer formed in a red discharge cell;
    a green fluorescent layer formed in a green discharge cell; and
    a blue fluorescent layer formed in a blue discharge cell;
    wherein the carbon nanotube layer is disposed in a discharge cell where one fluorescent layer having a lowest luminous efficiency among the red, green, and blue fluorescent layers is provided.

20. The light emitting layer of claim 19, wherein the carbon nanotube layer is disposed in discharge cells where two fluorescent layers having lower luminous efficiency among the red, green, and blue fluorescent layers are provided.

21. The light emitting layer of claim 19, wherein the carbon nanotube layer is disposed in the red, green, and blue discharge cells.

22. A light emitting layer, comprising:
a fluorescent layer; comprising:
a red fluorescent layer formed in a red discharge cell;
a green fluorescent layer formed in a green discharge cell; and
a blue fluorescent layer formed in a blue discharge cell; and
a carbon nanotube layer,
wherein the carbon nanotube layer completely covers the fluorescent layer, or is a continuous layer contacting a first partition, a second partition, and a dielectric layer,
wherein the carbon nanotube layer is disposed in the red, green, and blue discharge cells,
wherein the carbon nanotube layer is disposed in a discharge cell where one fluorescent layer having a lowest luminous efficiency among the red, green, and blue fluorescent layers is provided, and
wherein the carbon nanotube layer in the green discharge cell is thicker than the carbon nanotube layer in the blue discharge cell and the carbon nanotube layer in the red discharge cell.

23. A light emitting layer, comprising:
a fluorescent layer; and
a carbon nanotube layer,
wherein the carbon nanotube layer completely covers the fluorescent layer, or is a continuous layer contacting a first partition, a second partition, and a dielectric layer,
wherein the carbon nanotube layer is 5 μm thick or less.

* * * * *